(12) United States Patent
Kavadeles

(10) Patent No.: US 10,846,539 B2
(45) Date of Patent: *Nov. 24, 2020

(54) SHAPE/OBJECT RECOGNITION USING STILL/SCAN/MOVING IMAGE OPTICAL DIGITAL MEDIA PROCESSING

(71) Applicant: OPENGATE DEVELOPMENT, LLC, Santa Ana, CA (US)

(72) Inventor: Bill Kavadeles, Carlsbad, CA (US)

(73) Assignee: Opengate Development, LLC, Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,867

(22) Filed: Jul. 16, 2019

(65) Prior Publication Data

US 2019/0340442 A1 Nov. 7, 2019

Related U.S. Application Data

(63) Continuation of application No. 14/299,689, filed on Jun. 9, 2014, now Pat. No. 10,402,661.

(60) Provisional application No. 61/857,136, filed on Jul. 22, 2013.

(51) Int. Cl.
*H04N 7/18* (2006.01)
*G06K 9/00* (2006.01)

(52) U.S. Cl.
CPC .............................. *G06K 9/00771* (2013.01)

(58) Field of Classification Search
CPC .. G02B 27/2214; G02B 27/26; H04N 13/315; H04N 13/366; G09G 3/003; G09G 2354/00; G09G 2300/0426; G09G 2320/068; G09G 2320/0223; G09G 3/20; G02F 1/1343; G02F 1/136286

See application file for complete search history.

(56) References Cited

U.S. PATENT DOCUMENTS

| | | | | |
|---|---|---|---|---|
| 7,124,427 | B1 * | 10/2006 | Esbensen | G08B 13/19656 725/109 |
| 8,644,702 | B1 * | 2/2014 | Kalajan | G06F 21/6218 396/429 |
| 9,064,394 | B1 * | 6/2015 | Trundle | H04N 7/188 |
| 2008/0169929 | A1 * | 7/2008 | Albertson | G08B 13/19613 340/573.1 |
| 2011/0102588 | A1 * | 5/2011 | Trundle | G08B 25/008 348/143 |

(Continued)

*Primary Examiner* — Howard D Brown, Jr.
(74) *Attorney, Agent, or Firm* — Farjami & Farjami LLP

(57) ABSTRACT

There is provided a system and method for shape/object recognition using still/scan/moving image optical digital media processing. The system may include a user device and a cloud/server. The user device may be configured to capture a reference optical data using a capturing device, transmit the reference data to the cloud/server, capture a subsequent optical data using the capturing device, and transmit the subsequent optical data to the cloud/server. The cloud/server may be configured to receive the reference optical data from the user device, receive the subsequent optical data from the user device, compare the subsequent optical data to the reference optical data, and transmit a notification to the user device. The notification may include similarities and differences between the reference optical data and the subsequent optical data.

20 Claims, 5 Drawing Sheets

(56) References Cited

U.S. PATENT DOCUMENTS

| | | | | |
|---|---|---|---|---|
| 2013/0215266 A1* | 8/2013 | Trundle | ........... | G08B 13/19602 348/143 |
| 2014/0083188 A1* | 3/2014 | Helenelund | ............. | G01P 1/023 73/493 |
| 2014/0327768 A1* | 11/2014 | Marshall | ................ | H04N 7/183 348/143 |

\* cited by examiner

Fig. 2
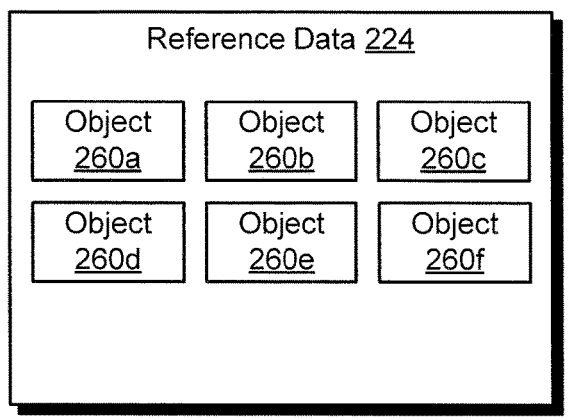
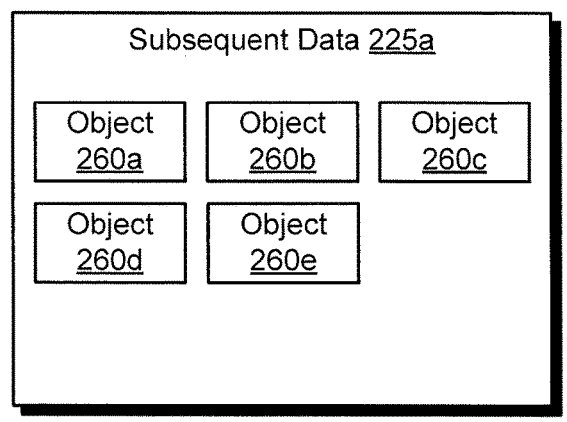
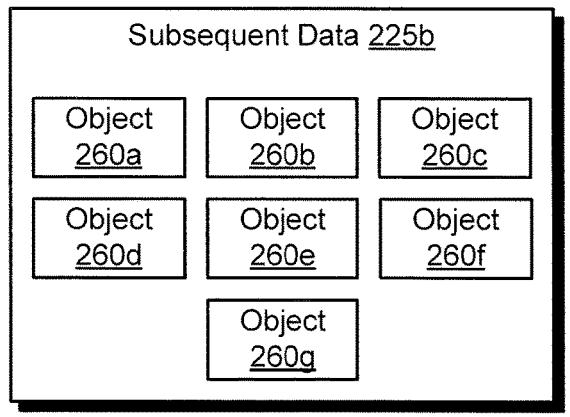
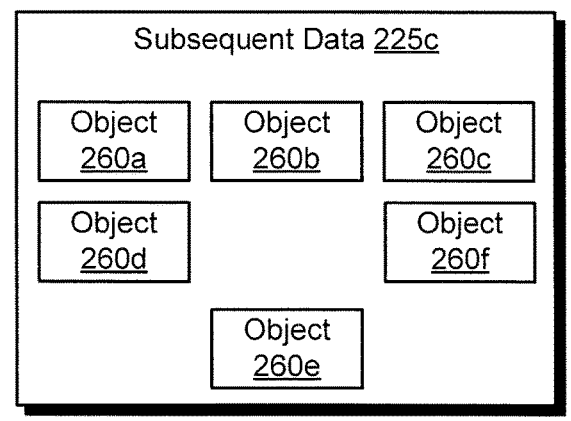

SHAPE/OBJECT RECOGNITION USING STILL/SCAN/MOVING IMAGE OPTICAL DIGITAL MEDIA PROCESSING

RELATED APPLICATIONS

The present application is a Continuation of U.S. application Ser. No. 14/299,689, filed Jun. 9, 2014, which claims the benefit of and priority to a U.S. Provisional Patent Application Ser. No. 61/857,136, filed Jul. 22, 2013 and titled "Shape/Object Recognition using Still/Scan/Moving Image Optical Digital Media Processing," which is hereby incorporated by reference in its entirety into the present application.

BACKGROUND

Security cameras are utilized in residential homes and businesses to protect both people and merchandise. However, security cameras have a lot flaws when it comes to protecting merchandise. One major flaw with security cameras is that they require at least one person to continuously view the security camera feed in order for the security cameras to be effective. For example, it can be difficult to see if merchandise has been stolen unless you are watching the security camera feed as it happens. This is because some merchandise is so small that it is nearly impossible to notice the merchandise is gone just by looking at the security camera feed after the merchandise has already been taken.

SUMMARY

The present disclosure is directed to shape/object recognition using still/scan/moving image optical digital media processing, substantially as shown in and/or described in connection with at least one of the figures, as set forth more completely in the claims.

BRIEF DESCRIPTION OF THE DRAWINGS

FIG. 2 presents examples of shape/object recognition using still/scan/moving image optical digital media processing, according to one implementation of the present disclosure.

DETAILED DESCRIPTION

Figure 1:
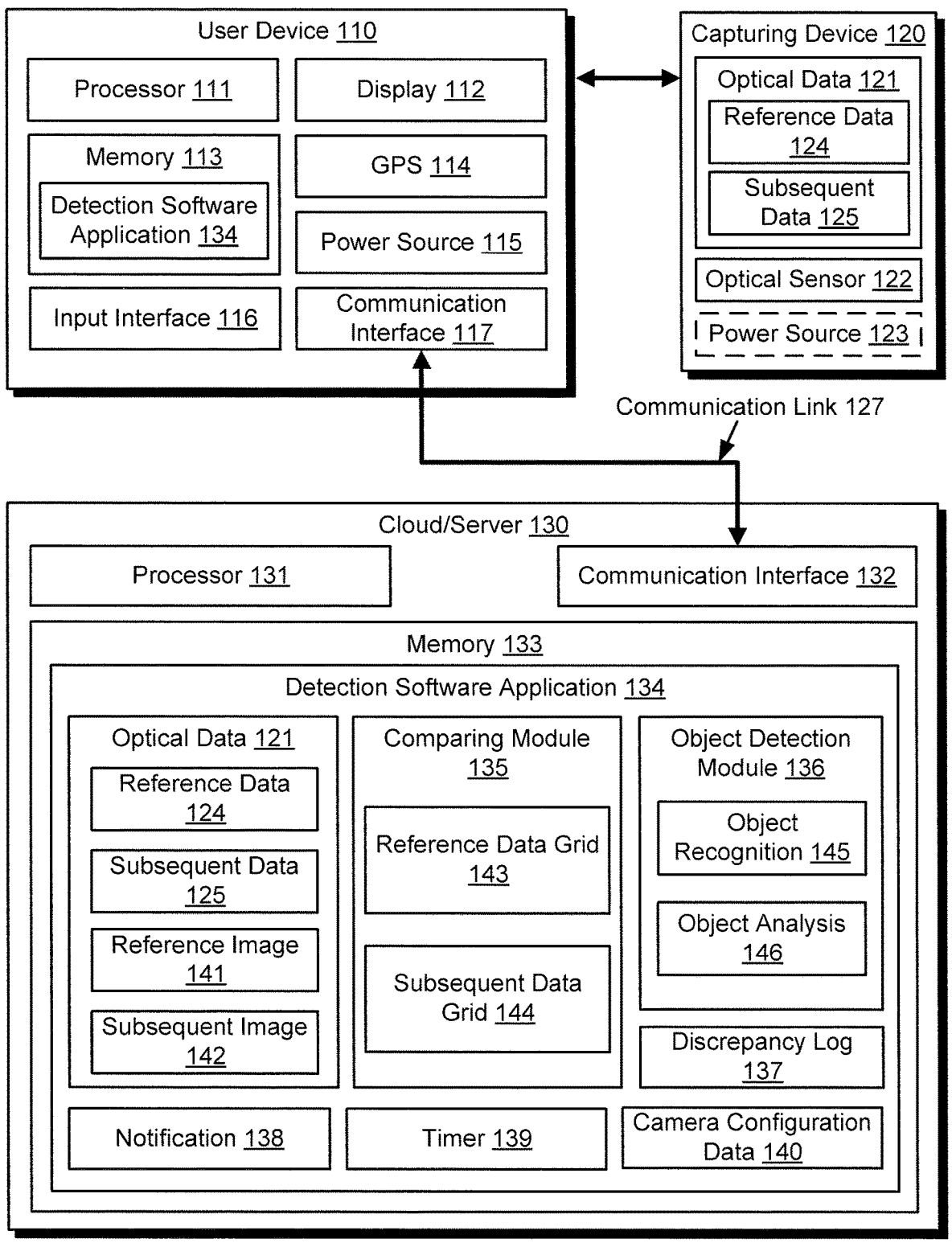
FIG. 1 presents a system for shape/object recognition using still/scan/moving image optical digital media processing, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a system for shape/object recognition using still/scan/moving image optical digital media processing, according to one implementation of the present disclosure. System 100 of FIG. 1 includes user device 110, capturing device 120, and cloud/server 130. User device 110 include processor 111, display 112, memory 113, Global Positioning System (GPS) 114, power source 115, input interface 116, and communication interface 117. Memory 113 includes detection software application 134. Capturing device 120 includes optical data 121, optical sensor 122, and power source 123. Cloud/Server 130 includes processor 131, communication interface 132, and memory 133. Memory 133 includes detection software application 134, which includes optical data 121, comparing module 135, object detection module 136, discrepancy log 137, notification 138, timer 139, and camera configuration data 140. Optical data 121 includes reference data 124, subsequent data 125, reference image 141, and subsequent image 142. Comparing module 135 includes reference data grid 143 and subsequent reference grid 144. Object detection module 136 includes object recognition 145 and object analysis 146.

As a preliminary note, it should be noted that the implementation of FIG. 1 illustrates user device 110 and cloud/server 130 including detection software application 134. In such an implementation, detection software application 134 may have come preinstalled on user device 110 and cloud/server 130 or a user may have intalled detection software application 134 on one or both of user device 110 and cloud/server 130. Furthermore, the implementation of FIG. 1 illustrates capturing device 120 as not including detection software application 134, however, the present disclosure is not limited to the implementation of FIG. 1. For example, in one implementation, capturing device 120 may include a special electronic device that includes detection software application 134 preinstalled. In such an implementation, capturing device 120 may include a special smart camera preinstalled with detection software application 134.

As illustrated in FIG. 1, system 100 includes user device 110 and cloud/server 130. User device 110 may include a personal computer, a mobile phone, a tablet, a video camera, or any other device capable of either capturing videos and pictures, or controlling a peripheral device to capture videos and pictures. Cloud/Server 130 may include a personal computer, a mobile phone, a tablet, or any other device capable of executing detection software application 134. Furthermore, the implementation of FIG. 1 only shows one user device 110 communicating with one cloud/server 130, however, the present disclosure is not limited to the implementation of FIG. 1. For example, in other implementations, there may be any number of user devices in communication with cloud/server 130.

User device 110 includes display 112 and input interface 116. Input interface 116 may include for example, a keyboard, a mouse, a game controller, a touch-screen input, a thermal and/or electrical sensor, or any other device capable of accepting user input for use with user device 110. Display 112 may comprise a liquid crystal display (LCD) screen built into user device 110. In alternative implementations of the present disclosure, display 112 may be another type of display hardware, such as cathode-ray tubes (CRT) monitors. In yet other implementations, display 112 may also be touch sensitive and may serve as input interface 116. Moreover, display 112 and user interface 116 may be externally attached to user device 110 through physical or wireless connection.

User device 110 further includes processor 111 and memory 113. Processor 111 may be configured to access memory 113 to store received input or to execute commands, processes, or programs stored in memory 113, such as detection software application 134. Processor 111 may correspond to a processing device, such as a microprocessor or similar hardware processing device, or a plurality of hardware devices. However, in other implementations processor 111 refers to a general processor capable of performing the functions required of user device 110. Memory 113 is capable of storing commands, processes, and programs for execution by processor 111. Memory 113 may be instituted as ROM, RAM, flash memory, or any sufficient memory capable of storing a set of commands. In other implementations, memory 113 may correspond to a plurality memory types or modules.

It should be noted that processor 131 and memory 133 of cloud/server 130 may be similar to processor 111 and memory 113 of user device 110. For example, processor 131 of cloud/server 130 may configured to store received input or to execute commands, processes, or programs stored in memory 133, such as detection software application 134. Furthermore, memory 133 may be capable of storing commands, processes, and programs for execution by processor 131.

Also illustrated in FIG. 1, user device 110 includes communication interface 117. Processor 111 of user device 110 is configured to control communication interface 117 to communicate with other electronic devices, such as communicating with cloud/server 130 through communication interface 132 of cloud/server 130, as illustrated by communication link 127. Communication interface 117 and communication interface 132 can utilize, as examples, one or more of Wireless Fidelity (Wi-Fi), Worldwide Interoperability for Microwave Access (WiMax), ZigBee, Bluetooth, Algorithm Division Multiple Access (CDMA), Evolution-Data Optimized (EV-DO), Global System for Mobile Communications (GSM), Long Term Evolution (LTE), and other types of wireless interfaces.

Also illustrated in FIG. 1, user device 110 utilizes capturing device 120 to capture optical data 121 using optical sensor 122. Optical data 121 can include a still image, a video, a data stream, a series of still images, a panorama, or any other type of optical data that can be captured using optical sensor 122. As such, capturing device 120 may include, but is not limited to, a video camera or any other device capable of capturing optical data 121. After capturing optical data 121, capturing device 120 transmits optical data 121 to user device 101. In the implementation of FIG. 1, capturing device 120 may transmit optical data 121 to user device 110 using any wired or wireless technology, such as Bluetooth or Wi-Fi. However, in other implementations, capturing device 120 may not be separate from user device 110 and may be physically attached or built into user device 110. In such implementations, processor 111 of user device 110 directs capturing device 120 to capture optical data 121.

It should be noted that the implementation of FIG. 1 illustrates both user device 110 and capturing device 120 as including power source 116 and optional power source 123, respectively. In implementations where capturing device 120 is separate from user device 110 and communicates with user device 110 wirelessly, capturing device 120 includes optional power source 123 as the power source for capturing device 120. However, in implementations where capturing device 120 is physically attached or built into user device 110, power source 115 of user device 110 may be the power source for capturing device 120. In such implementations, capturing device 120 would not include optional power source 123.

Also illustrated in FIG. 1, optical data 121 includes reference data 124 and subsequent data 125. As will be described in greater detail below, reference data 124 corresponds to the first optical data 121 captured by capturing device 120 and subsequent data 125 corresponds to optical data 121 that is captured at a later time than reference data 124. As such, in one implementation, user device 110 may utilize capturing device 120 to automatically capture subsequent data 125 after an expiration of a predefined time interval after capturing reference data 124. However, in another implementation, user device 110 may utilize capturing device 120 to capture subsequent data 125 when user device 110 receives an input from a user using input interface 116 to capture subsequent data 125.

Also illustrated in FIG. 1, after capturing optical data 121 using capturing device 120, user device 110 transmits optical data 121 to cloud/server 130 using communication link 127 so that cloud/server 130 can process optical data 121 using detection software application 134. In one implementation, before user device 110 transmits optical data 121 to cloud/server 130, optical data 121 may first be pre-processed via software that is running on user device 110. However, in other implementations, optical data 121 is unprocessed or minimally processed so as to be RAW image data (digital negative data.) For example, optical data 121 may not be exposed to low or high pass filtering and/or aliasing. Furthermore, in other implementations, optical data 121 can have reduced information so as to reduce the amount of data to be transferred to cloud/server 130.

It should be noted that FIG. 1 illustrates optical data 121 being transmitted from user device 110 to cloud/server 130 while including both reference data 124 and subsequent data 125, however, the present disclosure is not limited to optical data 121 being transmitted to cloud/server 130 while including both reference data 124 and subsequent data 125. For example, and as discussed above, subsequent data 125 is captured using capturing device 120 at a later time than reference data 124. As such, in one implementation, user device 110 transmits reference data 124 to cloud/server 130 after capturing device 120 captures reference data 124, and then user device 110 transmits subsequent data 125 at the later time to cloud/server 130, such as when capturing device 120 captures subsequent data 125. In such an implementation, user device 110 may systematically capture and transmit subsequent data 125 to cloud/server 130 after first transmitting reference data 124 to cloud/server 130.

It should further be noted that in one implementation, reference data 124 is tagged with metadata describing reference data 124 before reference data 124 is transmitted from user device 110 to cloud/server 130. In such an implementation, the metadata may include, but is not limited to, a time of when reference data 124 was captured, a location of where reference data 124 was captured, an identification for user device 110 that transmitted reference data 124, or any other data that can describe reference data 124. Furthermore, subsequent data 125 may also be tagged with metadata before being transmitted from user device 110 to cloud/server 130. The metadata for subsequent data 125 may describe subsequent data 125 similarly to how the metadata for reference data 124 described reference data 124, however, the metadata for subsequent data 125 may further include a reference to reference data 124. By tagging each of reference data 124 and subsequent data 125 with metadata, cloud/server 130 is able to store subsequent data 125 with reference data 124 in memory 133 for final processing.

Also illustrated in FIG. 1, optical data 121 of detection software application 134 includes further includes reference image 141 and subsequent image 142. As such, in the implementation of FIG. 1, after cloud/server 130 receives each of reference data 124 and subsequent data 125 from user device, detection software application 134 may generate a reference image for each of reference data 124 and subsequent data 125 as reference image 141 and subsequent image 142, respectively. Each of reference image 141 and subsequent image 142 may include, but are not limited to, a Joint Photographic Experts Group (JPEG) image that can be viewed using various devices. For example, each of reference image 141 and subsequent image 142 may include a JPEG image that can be transmitted to user device 110 and viewed using display 112.

Also illustrated in FIG. 1, detection software application 134 includes comparing module 135. Detection software application 134 utilizes comparing module 135 to compare subsequent data 125 with reference data 124. To compare subsequent data 125 with reference data 124, comparing module 135 first preprocesses reference data 124 by generating reference data grid 143 for reference data 124. Reference data grid 143 may include information describing reference data 124. Such information can include descriptions of one or more objects identified in reference data 124 and/or various characteristics of particular regions in reference data 124. Furthermore, location data, such as coordinates, may be included in reference data grid 143, where the location data is associated with the objects or particular regions of reference data 124. For example, the objects or particular regions may be mapped to a two-dimensional or three-dimensional grid in reference data 124.

It should be noted that reference data grid 143 may be generated using pixel mapping techniques by preprocessing reference data 124 into proprietary pixel mapping code. This allows for integrated mapping technology of each pixel and creates a relational database of the pixel mapped data. Furthermore, metadata may be added to the pixel mapping to map reference points in the pixel mapped data.

Comparing module 135 next preprocesses subsequent data 124 by generating subsequent data grid 144. In one implementation, subsequent data grid 144 is generated in a manner similar to reference data grid 143. For example, in such an implementation, subsequent data grid 144 includes information describing subsequent data 125, where such information can include descriptions of one or more objects identified in subsequent data 125 and/or various characteristics of particular regions in subsequent data 125. However, in other implementations, subsequent data grid 144 may be generated to not include as much information as reference data grid 143. For example, in such implementations, subsequent data grid 144 may only include the necessary information required to compare subsequent data 125 to reference data 124.

It should be noted that, as discussed above with reference data 124, subsequent data grid 144 may also be generated using pixel mapping techniques by processing subsequent data 125 into proprietary pixel mapping code. Again, this allows for integrated mapping technology of each pixel and creates a relational database of the pixel mapped data. Furthermore, metadata may be added to the pixel mapping to map reference points in the pixel mapped data.

It should further be noted detection software application 134 may utilize comparing module 134 to preprocess reference data 124 by generating reference data grid 143 in response to user device 110 transmitting reference data 124 to cloud/server 130. For example, in one implementation, as discussed above, user device 110 may utilize capturing device 120 to first capture reference data 124 and then transmit reference data 124 to cloud/server 130. In such an implementation, detection software application 134 may generate reference data grid 143 as soon as reference data 124 is received. Detection software application 134 would then preprocess subsequent data 125 by generating subsequent data grid 144 at a later time, such as when cloud/server 130 receives subsequent data 125 from user device 110.

After generating reference data grid 143 and subsequent data grid 144, comparing module 135 then compares subsequent data grid 144 to reference data grid 143. In comparing subsequent data grid 144 to reference data grid 143, comparing module 135 identifies differences and/or similarities between reference data grid 143 and subsequent data grid 144. The identifying may include object recognition and shape recognition. For example, in one implementation, the comparison determines whether an object or region has moved, has changed, or has otherwise been altered from a condition that was in reference data 124. For another example, in another implementation, the comparison may further detect new objects or regions that were not present in reference data 124 or objects or regions that are not longer present from reference data 124.

It should be noted that comparing module 135 may utilize pixel recognition when identifying the differences and/or similarities between reference data grid 143 and subsequent data grid 144. For example, and as discussed above, identifying the differences and/or similarities between reference data grid 143 and subsequent data grid 144 may include object recognition. When using object recognition, comparing module 135 may utilize pixel recognition to determine objects within reference data grid 143 and subsequent data grid 144. Furthermore, comparing module 135 may utilize pixel recognition to determine if the objects within subsequent data grid 144 have moved with regards to reference data grid 143.

Also illustrated in FIG. 1, detection software application 134 further includes object detection module 136. As discussed above, when identifying differences and/or similarities between reference data grid 143 and subsequent data grid 144, the identifying may include recognition of objects within reference data 124 and subsequent data 125. As such, detection software application 134 may utilize object detection module 136 to identify and analyze objects within reference data 124 and subsequent data 125.

To identify and analyze objects within reference data 124 and subsequent data 125, object detection module 136 includes object recognition 145 and object analysis 146. Object recognition 145 is used by object detection module 136 to identify any object that is included in reference data 124 and subsequent data 125. Objects can include people, animals, products, money, or any other objects that can be captured and included in optical data 121. Furthermore, object recognition 145 may identify how many of each object are in reference data 124 and subsequent data 125. For example, object recognition 145 may identify how much money is present in reference data 124 when reference data 124 includes a picture of a cash register.

It should be noted that object detection module 136 may utilize pixel recognition when determining objects within reference data 124 and subsequent data 125 using object recognition 145. For example, object detection module 136 may utilize pixel recognition to recognize pixels within reference data 124 and subsequent data 125 and utilize the recognized pixels to determine the objects that are in reference data 124 and subsequent data 125. By using pixel recognition, object detection module 136 may better determine the objects that present in each of reference data 124 and subsequent data 125.

Object analysis 146 is used by object detection module 136 to analyze any objects that were identified by object recognition 145. Analyzing an object can include, but is not limited to, researching (for example, using the Internet) and providing facts about the object. For example, detection software application 134 may utilize object recognition 145 to determine that an object in reference data 124 corresponds to a gold brick. In such an example, detection software application 134 may further utilize object analysis 146 to determine how much the gold brick is worth using the present cost of gold.

Also illustrated in FIG. 1, detection software application 134 further includes discrepancy log 137. Detection software application 134 may utilize discrepancy log 137 to record the results of comparing module 135. For example, discrepancy log 137 may include entries that detail any information determined from the comparison between reference data grid 143 and subsequent data grid 144. In such an example, the entries in discrepancy log 137 may include information such as, but not limited to, a time lapse between capturing reference data 124 and subsequent data 125, date stamps for reference data 124 and subsequent data 125, and location data describing where reference data 124 and subsequent data 125 were captured. Furthermore, the entries may include data corresponding to regions in reference data 124 or subsequent data 125 of where differences occur.

Also illustrated in FIG. 1, detection software application 134 further includes notification 138. At a predetermined time interval or based on the results determined by comparison module 135, detection software application 134 may provide notification 138 to user device 110 or other electronic devices. For example, notification 138 may correspond to an alert warning a user of user device 110 that a security breach has occurred based on the comparison of subsequent data 125 to reference data 124. For another example, notification 138 may include data corresponding to the results from the comparison of subsequent data 125 to reference data 124. In such an example, the data may be in the form of a chart that maps the difference between reference data 124 and subsequent data 125. Furthermore, the data may include probability percentile categories for the similarities and differences between reference data grid 143 and subsequent data grid 144.

Also illustrated in FIG. 1, detection software application 134 further includes timer 139. As discussed above, in one implementation, user device 110 utilizes capturing device 120 to capture subsequent data 125 after an expiration of a predetermined time interval after capturing reference data 124. As such, detection software application 134 utilizes timer 139 to keep track or how long it has been since capturing reference data 124. Cloud/Server 130 may then transmit a notification to user device 110 that the predetermined time interval has expired. In response to receiving the notification from cloud/server 130, user device 110 may either warn a user of user device 110 that it is time to capture subsequent data 125, or user device 110 may automatically capture subsequent data 125 using capturing device 120.

Also illustrated in FIG. 1, detection software application 134 further includes camera configuration data 140. Camera configuration data 140 includes data corresponding to the configuration of capturing device 120 when capturing device 120 captured reference data 124. The configuration of capturing device 120 can include, but is not limited to, position data such as three-dimensional coordinates such as longitude and latitude coordinates, camera view orientation data such as camera angle, focal length and focus distance, gyroscopic data, movement data such as a motion path or velocity and acceleration, and camera characteristics data such as lens parameters, camera size, center of lens, and other camera modeling details. Detection software application 134 can thus utilize camera configuration data 140 by transmitting camera configuration data 140 to user device 110 so that user device 110 configures capturing device 120 similarly when capturing subsequent data 125 as capturing device 120 was configured when capturing reference data 124.

For example, user device 110 may transmit camera configuration data 140 to cloud/server 130 when user device transmits reference data 124 to cloud/server 130, where camera configuration data 140 includes the camera configuration of capturing device 120 when capturing device 120 captured reference data 124. User device 110 may then receive camera configuration data 140 from cloud/server 130 when it is time for user device 110 to capture subsequent data 125, and user device 110 may utilize camera configuration data 140 to configured capturing device 120 for capturing subsequent data 125. For example, user device 110 may utilize GPS 114 and the position data from camera configuration data 140 to position capturing device 120. Furthermore, user device 110 may utilize the camera view orientation data and the camera characteristics data from camera configuration data 140 to configure capturing device 120. In one implementation, user device 110 may provide a user with directions and indications on configuring capturing device 120 for capturing subsequent data 125, such as visual and audible feedback. In other implementations, user device 110 may automatically configure capturing device 120 for capturing subsequent data 125 without user interaction.

In the implementation of FIG. 1, user device 110 utilizes capturing device 120 to capture reference data 124. As discussed above, reference data 124 may include a still image, a video, a data stream, a series of still images, a panorama, or any other type of optical data. User device 110 then transmits reference data 124 to cloud/server 130 through communication link 127. After cloud/server 130 receives reference data 124, cloud/server 130 preprocesses reference data 124 be generating reference data grid 143, where, as discussed above, reference data grid 143 includes information about reference data 124. Information about reference data 124 may include descriptions of one or more objects identified in reference data 124 and/or various characteristics of particular regions in reference data 124. After generating reference data grid 143, cloud/server 130 stores reference data 124 and reference data grid 143 in memory 133.

Next, cloud/server 130 utilizes timer 139 to determine that a predetermined time interval has expired since the capturing of reference data 124. At the expiration of the predetermined time interval, cloud/server 130 transmits a notification to user device 110, where the notification notifies user device 110 to utilize capturing device 120 to capture subsequent data 125. Cloud/Server 130 may further transmit camera configuration data 140 to user device 110 so that user device 110 can configured capturing device 120 when capturing subsequent data 125 similarly to capturing device 120 was configured when capturing reference data 124. After user device 110 captures subsequent data 125, user device 110 transmits subsequent data 125 to cloud/server 130.

After receiving subsequent data 125 from user device 110, cloud/server 130 preprocesses subsequent data 125 in a similar manner as cloud/server 130 preprocessed reference data 124 by generating subsequent data grid 144. Cloud/Server 130 then utilizes comparing module 135 to compare subsequent data grid 144 to reference data grid 143. As discussed above, in comparing subsequent data grid 144 to reference data grid 143, comparing module 135 identifies differences and/or similarities between reference data grid 143 and subsequent data grid 144. The identifying may include object recognition, where objects are recognized using pixel recognition. For example, in one implementation, the comparison determines whether an object or region has moved, has changed, or has otherwise been altered from a condition that was in reference data 124. For another example, in another implementation, the comparison may further detect new objects or regions that were not present in reference data 124 or objects or regions that are not longer present from reference data 124.

Finally, after cloud/server 130 has finished comparing subsequent data grid 144 to reference data grid 143, cloud/server 130 transmits notification 138 to user device 110, where notification 138 includes data corresponding to the results of the comparison. Furthermore, cloud/server 130 may generate discrepancy log 137. As discussed above, discrepancy log 137 may include a listing of the results for each time cloud/server 130 compares subsequent data 125 to reference data 124.

It should be noted that the implementation of FIG. 1 only discusses capturing and transmitting one subsequent data 125 to cloud/server 130, however, the present disclosure is not limited to only capturing and transmitting one subsequent data 125 to cloud/server 130. For example, in one implementation, user device 110 may capture and transmit subsequent data 125 to cloud/server 130 multiple times, such as periodically in intervals, so that cloud/server 130 can continually compare subsequent data 125 to reference data 124. In such an implementation, each time user device 110 transmits a new subsequent data to cloud/server 130, cloud/server 130 may make that new subsequent data the reference data for the next time user device 110 transmits subsequent data. For another example, in another implementation, subsequent data 125 may include a video that continuously is transmitted from user device 110 to cloud/server 130.

It should further be noted that in one implementation, cloud/server 130 may require the user of user device 110 to create an account to utilize the services of detection software application 134 on cloud/server 130. For example, before user device 110 transmits any optical data 121 to cloud/server 130, a user of user device 110 may be required to create an account with cloud/server 130. In such an example, each time user device 110 utilizes cloud/server 130, such as by transmitting optical data 121 to cloud/server 130, the user of user device 110 may be required to log into his or her account. Logging into an account may included, but is not limited to, submitting a username and password for the account, using fingerprint technology to identify the user to unlock the account, or using facial recognition to identify the user to unlock the account. Furthermore, the account may require the user to pay a subscription fee to utilize the services of detection software application 134 on cloud/server 130.

Finally, it should be noted that the implementation of FIG. 1 illustrates that user device 110 includes detection software application 134. In one implementation, user device 110 may not need to transmit any optical data 121 to cloud/server 130 as user device 110 is able to process optical data 121 using detection software application 134 stored in memory 113. Furthermore, in other implementations, user device 110 and cloud/server 130 may work together to process optical data 121. For example, user device 110 may generate reference data grid 143 and subsequent data grid 144 and transmit reference data grid 143 with reference data 124 and subsequent data grid 144 with subsequent data 125 to cloud/server 130. In such an example, cloud/server 130 may then compare subsequent data grid 144 to reference data grid 143 and transmit the results to user device 110. However, still in other implementations, user device 110 may not include detection software application 134. In such implementations, user device 110 merely transmits optical data 121 to cloud/server 130 and receives notification 138 back from cloud/server 130.

FIG. 2 presents examples of shape/object recognition using still/scan/moving image optical digital media processing, according to one implementation of the present disclosure. FIG. 2 includes reference data 224, subsequent data 225a, subsequent data 225b, and subsequent data 225c. Reference data 224 includes objects 260a-f. Subsequent data 225a includes objects 260a-e. Subsequent data 225b includes objects 260a-g. Subsequent data 225c includes objects 260a-f. With regards to FIG. 2, it should be noted that reference data 224 corresponds to reference data 124 from FIG. 1. It should further be noted that each of subsequent data 225a, subsequent data 225b, and subsequent data 225c of FIG. 2 correspond to subsequent data 125 from FIG. 1.

As illustrated in FIG. 2, a capturing device, such as capturing device 120 from FIG. 1, has captured reference data 224 and three subsequent data, subsequent data 225a, subsequent data 225b, and subsequent data 225c. In the implementation of FIG. 2, each of subsequent data 225a, subsequent data 225b, and subsequent data 225c may have been captured using similar a camera configuration as reference data 224. As such, each of subsequent data 225a, subsequent data 225b, and subsequent data 225c should be similar to and include the same objects as reference data 224 when compared using a detection software application, such as detection software application 134 from FIG. 1.

In the implementation of FIG. 2, when comparing subsequent data 242a to reference data 242, a detection software application would determine that object 260f has been removed. When comparing subsequent data 242b to reference data 242, the detection software application would determine that object 260g has been added. Furthermore, when comparing subsequent data 242c to reference data 242, the detection software application would determine that object 260e has been moved. In each scenario described above, the detection software application may transmit an alert to a user device to notify the user device that there might be security problems. For example, and using FIG. 1, cloud/server 130 may transmit notification 138 to user device 110, where notification 138 includes an alert that there might be security problems.

Figure 3:
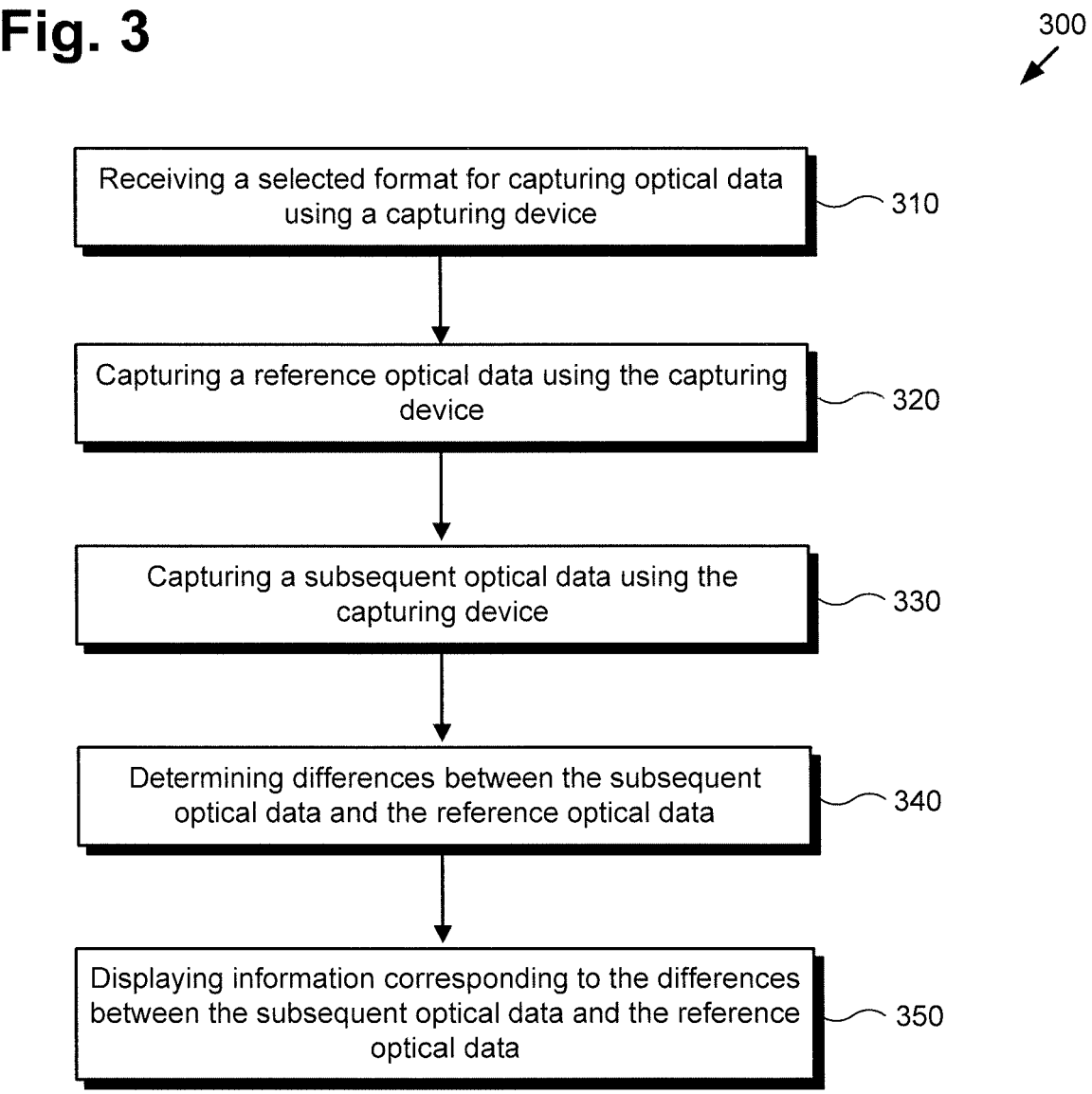
FIG. 3 shows a flowchart illustrating a method utilized by a user device for shape/object recognition using still/scan/moving image optical digital media processing, according to one implementation of the present disclosure.

FIG. 3 shows a flowchart illustrating a method utilized by a user device for shape/object recognition using still/scan/moving image optical digital media processing, according to one implementation of the present disclosure. The approach and technique indicated by flowchart 300 are sufficient to describe at least one implementation of the present disclosure, however, other implementations of the disclosure may utilize approaches and techniques different from those shown in flowchart 300. Furthermore, while flowchart 300 is described with respect to FIG. 1, the disclosed inventive concepts are not intended to be limited by specific features shown and described with respect to FIG. 1. Furthermore, with respect to the method illustrated in FIG. 3, it is noted that certain details and features have been left out of flowchart 300 in order not to obscure the discussion of inventive features in the present application.

As a preliminary note to flowchart 300, flowchart 300 discusses a first implementation and a second implementation of the method of flowchart 300. In the first implementation, user device 110 utilizes detection software application 134 to compare subsequent data 125 to reference data 124. As such, in the first implementation, user device 110 does not utilize cloud/server 130. In the second implementation, user device 110 utilizes cloud/server 130 to compare subsequent data 125 to reference data 124. As such, in the second implementation, user device 110 transmits reference data 124 and subsequent data 125 to cloud/server 130 and receives notification 138 from cloud/server 130. Furthermore, the method of cloud/server 130 receiving reference data 124 and subsequent data 125 from user device 110 to compare subsequent data 125 to reference data 124 is described in detail with regards to flowchart 400 of FIG. 4.

Referring now to flowchart 300 of FIG. 3, flowchart 300 includes receiving a selected format for capturing optical data using a capturing device. (310). For example, processor 111 of user device 110 may execute detection software application 134 to receive a selected format for capturing optical data 121 using capturing device 120. As discussed above, the selected format for optical data 121 may include a still image, a video, a data stream, a series of still images, a panorama, or any other type of optical data. The selected format may be selected by a user of user device 110 using input interface 116.

Flowchart 300 also includes capturing a reference optical data using the capturing device (320). For example, processor 111 of user device 110 may execute detection software application 134 to utilize capturing device 120 to capture reference data 124. In the first implementation, after capturing reference data 124, processor 111 may execute detection software application 134 to preprocess reference data 124 by generating reference data grid 143. As discussed above, reference data grid 143 may include information describing reference data, such as descriptions of one or more objects identified in reference data 124 and/or various characteristics of particular regions in reference data 124.

In the second implementation, after capturing reference data 124, processor 111 of user device 110 transmits reference data 124 to cloud/server 130 to be preprocessed by cloud/server 130. In such an implementation, as discussed above, reference data 124 may first be tagged with metadata. Furthermore, a user of user device 110 may need to log into his or her account on cloud/server 130 before transmitting reference data 124 to cloud/server 130.

Flowchart 300 also includes capturing a subsequent optical data using the capturing device (330). For example, processor 111 of user device 110 may execute detection software application 134 to utilize capturing device 120 to capture subsequent data 125. As discussed above, user device 110 may capture subsequent data 125 at the expiration of a predefined time interval after capturing reference data 124 or in response to a user input. Furthermore, in the first implementation, after capturing subsequent data 125, processor 111 may execute detection software application 134 to preprocess subsequent data 125 by generating subsequent data grid 144 in a similar way as reference data grid 143 was generated from reference data 124.

In the second implementation, after capturing subsequent data 125, processor 111 of user device 110 transmits subsequent data 125 to cloud/server 130 to be preprocessed by cloud/server 130. In such an implementation, the user of user device 110 may again have to log into his or her account before transmitting subsequent data 125 to cloud/server 130.

Flowchart 300 also includes determining differences between the subsequent optical data and the reference optical data (340). For example, in the first implementation, processor 111 of user device 110 may execute detection software application 134 to determine difference between subsequent data 125 and reference data 124. In such an implementation, detection software application 134 may determine the differences by utilizing comparing module 135 to compare subsequent data grid 144 to reference data grid 143. As discussed above, in comparing subsequent data grid 144 to reference data grid 143, comparing module 135 identifies differences and/or similarities between reference data grid 143 and subsequent data grid 144.

In the second implementation, where user device 110 transmits reference data 124 and subsequent data 125 to cloud/server 130, processor 111 of user device 110 may receive notification 138 from cloud/server 130. In such an implementation, notification 138 may include the results of cloud/server 130 comparing subsequent data grid 144 to reference data grid 143. As discussed above, the method of cloud/server 130 comparing subsequent data 125 to reference data 124 is described in greater detail with regards to flowchart 400 of FIG. 4.

Flowchart 300 also includes displaying information corresponding to the differences between the subsequent optical data and the reference optical data (350). For example, processor 111 of user device 110 may execute detection software application 134 to display information corresponding to the differences between subsequent data 125 and reference data 124 on display 112. In such an example, the information may include the results of the comparison of subsequent data grid 144 to reference data grid 143.

Figure 4:
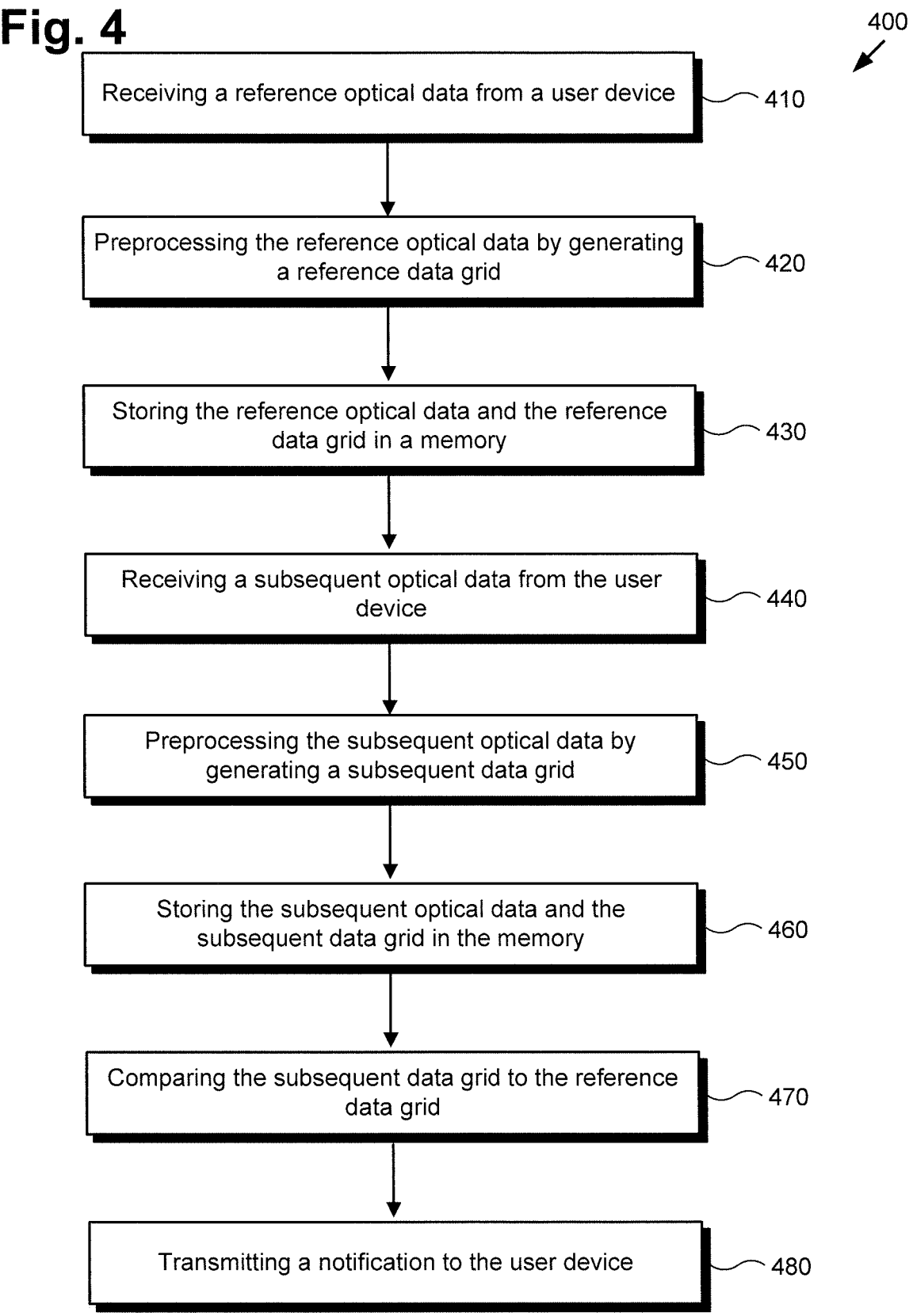
FIG. 4 shows a flowchart illustrating a method utilized by a cloud/server for shape/object recognition using still/scan/moving image optical digital media processing, according to one implementation of the present disclosure.

FIG. 4 shows a flowchart illustrating a method utilized by a cloud/server for shape/object recognition using still/scan/moving image optical digital media processing, according to one implementation of the present disclosure. The approach and technique indicated by flowchart 400 are sufficient to describe at least one implementation of the present disclosure, however, other implementations of the disclosure may utilize approaches and techniques different from those shown in flowchart 400. Furthermore, while flowchart 400 is described with respect to FIG. 1, the disclosed inventive concepts are not intended to be limited by specific features shown and described with respect to FIG. 1. Furthermore, with respect to the method illustrated in FIG. 4, it is noted that certain details and features have been left out of flowchart 400 in order not to obscure the discussion of inventive features in the present application.

Referring now to flowchart 400 of FIG. 4, flowchart 400 includes receiving a reference optical data from a user device (410) and preprocessing the reference optical data by generating a reference data grid (420). For example, processor 131 of cloud/server 130 may execute detection software application 134 to receive reference data 124 from user device 110. After receiving reference data 124 from user device 110, processor 131 of cloud/server 130 may execute detection software application 134 to preprocess reference data 124 by generating reference data grid 143. As discussed above, reference data grid 143 may include information describing reference data 124, such as descriptions of one or more objects identified in reference data 124 and/or various characteristics of particular regions in reference data 124. Furthermore, a user of user device 110 may need to log into his or her account before cloud/server 130 receives reference data 124.

Flowchart 400 also includes storing the reference optical data and the reference data grid in a memory (430). For example, processor 131 of cloud/server 130 may execute detection software application 134 to store reference data 124 and reference data grid 143 in memory 133. In such an example, cloud/server 130 may store reference data 124 and reference data grid 143 in the account of the user of user device 110. Furthermore, in one implementation, processor 131 may execute detection software application 134 to transmit a notification to user device 110 to notify the user of user device 110 that reference data 124 has been preprocessed and that cloud/server 130 is waiting for subsequent data 125.

Flowchart 400 also includes receiving a subsequent optical data from the user device (440) and preprocessing the subsequent optical data by generating a subsequent data grid (450). For example, processor 131 of cloud/server 130 may execute detection software application 134 to receive subsequent data 125 from user device 110. After receiving subsequent data 125 from user device 110, processor 131 of cloud/server 130 may execute detection software application 134 to preprocess subsequent data 125 by generating subsequent data grid 144. As discussed above, subsequent data grid 144 may include information describing subsequent data 125, such as descriptions of one or more objects identified in subsequent data 125 and/or various characteristics of particular regions in subsequent data 125. Furthermore, a user of user device 110 may need to log into his or her account before cloud/server 130 receives subsequent data 125.

Flowchart 400 also includes storing the subsequent optical data and the subsequent data grid in the memory (460). For example, processor 131 of cloud/server 130 may execute detection software application 134 to store subsequent data 125 and subsequent data grid 144 in memory 133. In such an example, cloud/server 130 may store subsequent data 125 and subsequent data grid 144 in the account of the user of user device 110. Furthermore, in one implementation, processor 131 may execute detection software application 134 to transmit a notification to user device 110 to notify the user of user device 110 that subsequent data 125 has been preprocessed.

Flowchart 400 also includes comparing the subsequent data grid to the reference data grid (470). For example, processor 131 of cloud/server 130 may execute detection software application 134 to compare subsequent data grid 144 to reference data grid 143. As discussed above, in comparing subsequent data grid 144 to reference data grid 143, comparing module 135 identifies differences and/or similarities between reference data grid 143 and subsequent data grid 144. The identifying may include object recognition and shape recognition. For example, in one implementation, the comparison determines whether an object or region has moved, has changed, or has otherwise been altered from a condition that was in reference data 124. For another example, in another implementation, the comparison may further detect new objects or regions that were not present in reference data 124 or objects or regions that are not longer present from reference data 124.

Flowchart 400 also includes transmitting a notification to the user device (480). For example, processor 131 of cloud/server 130 may execute detection software application 134 to transmit notification 138 to user device 110. As discussed above, notification 138 may include data corresponding to the results from the comparison of subsequent data 125 to reference data 124. The data may be in the form of a chart that maps the difference between subsequent data 125 and reference data 124. Furthermore, the data may include probability percentile categories for the similarities and differences of reference data grid 143 and subsequent data grid 144.

Figure 5:
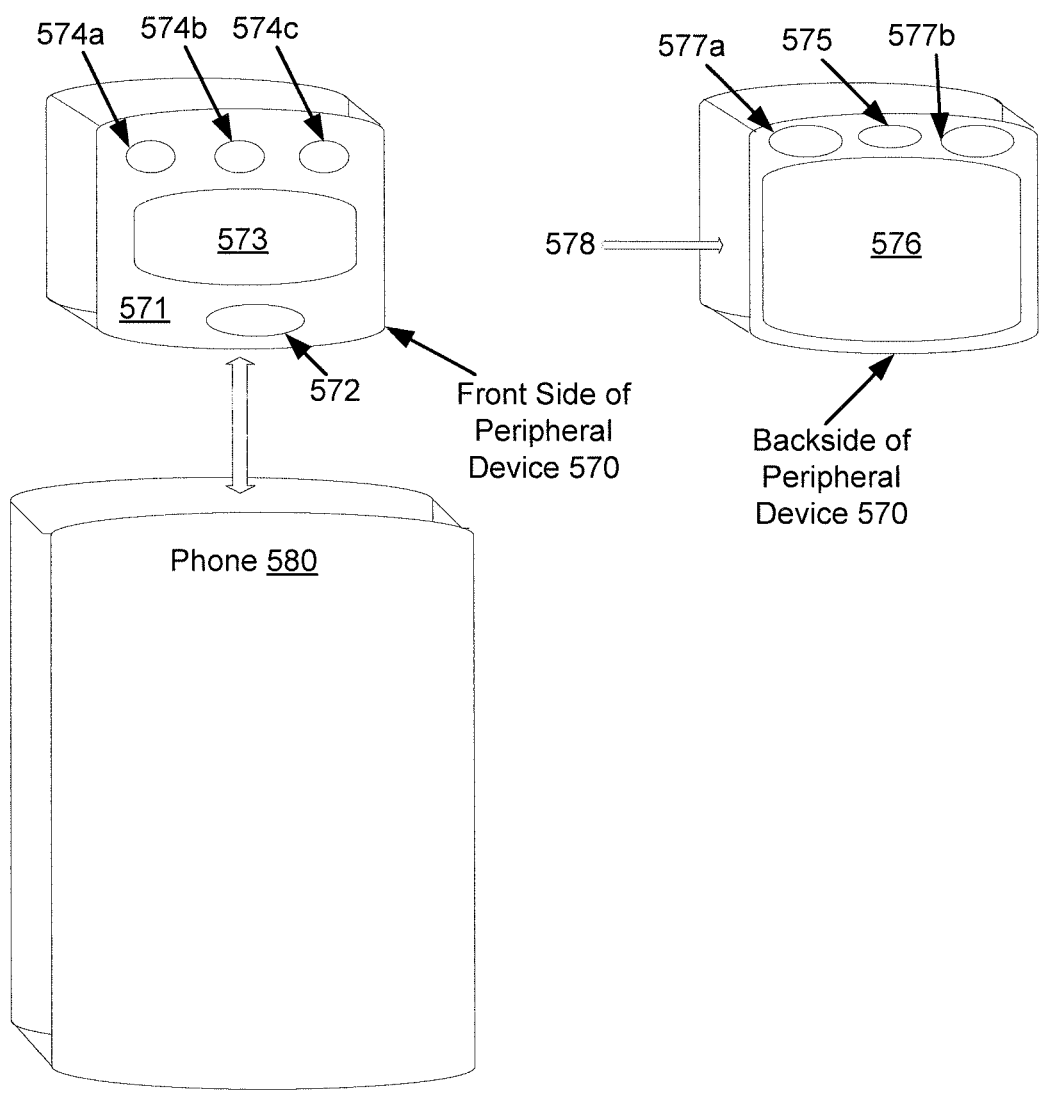
FIG. 5 presents an example of a peripheral device integrated with a phone, according to one implementation of the present disclosure.

FIG. 5 presents an example of a peripheral device integrated with a phone, according to one implementation of the present disclosure. FIG. 5 includes a front side of peripheral device 570, a backside of peripheral device 570, and phone 580. Peripheral device 570*a* includes enclosure 571, photo cell assembly 572, lens assembly 573, and flash assembly 574*a*, flash assembly 574*b*, and flash assembly 574*c*, collectively referred to as flash assemblies 574. Peripheral device 570*b* includes power switch 575, viewing screen 576, and speaker 577*a* and speaker 577*b*, collectively referred to as speakers 577. Also illustrated in FIG. 5 is inside enclosure 578.

It should be noted that with regards to FIG. 5, peripheral device 570 may correspond to capturing device 120 from FIG. 1, and phone 580 may correspond to user device 110 from FIG. 1.

As illustrated in FIG. 5, the front side of peripheral device 570 includes enclosure 571, photo cell assembly 572, lens assembly 573, and flash assemblies 574, while the backside of peripheral device 570 includes power switch 575, viewing screen 576, and speakers 577. Enclosure 570 may include a metal or plastic enclosure that holds the components of peripheral device 570 together. Flash assemblies 574 may include light-emitting diodes (LEDs) or Xeon. Viewing screen 576 may include liquid-crystal display. Furthermore, it should be noted that the implementation of FIG. 5 only illustrates one example of a peripheral device, however, the present disclosure is not limited to the implementation of FIG. 5. For example, in other implementations, each of the components of peripheral device 570 may be arranged using different arrangements.

Also illustrated in FIG. 5 is inside enclosure 578. Inside enclosure 578 includes all of the components that are inside peripheral device 570. Those components can include, but are not limited to, a processor, a printed circuit board, an integrated circuit, a power conversion, phone data communications, GPS coordinates tracking, Bluetooth or other wireless communications, and memory storage.

Implementations of the present disclosure can provide an effective and efficient way to track inventory, act as a first step in security by identifying objects that are out of place or have otherwise been disturbed, and have access to information from the internet in order to provide a user with information on an object or objects in subsequent data 125. For example, reference data grid 143 can be generated by capturing reference data 124 of inventory stock at the beginning of a work shift. Subsequent data 125 can be captured at the end of the work shift or throughout the day. Subsequent data 125 can be compared to reference data 124 (e.g. by comparing subsequent data grid 144 to reference data grid 143) to count the amount of remaining inventory, measure the amount of inventory used, detect shoplifting and/or employee theft, and/or identify other discrepancies.

Exemplary implementations can include at least some of the following features, which may be implemented as capturing device 120 described above and illustrated in FIG. 1. We note that any of the features shown and described in FIG. 1 can be implemented in a single device (e.g. user device 110 and capturing device 120 can be a single device) with a stand alone or shared housing that includes unique shaped or multiple precision lenses and optical sensor 122 to capture the reference data 124 and subsequent data 125. The lenses have a focal length to optimize exposure control and depth of field. The focal length can optimize extreme wide angle to telephoto capability via an actual multiple lens layer setup and/or digital zoom/wide angle enhancements. Focusing can be accomplished via approximately 100 or more focusing points laid out in a rectangular grid with focusing points of approximately 100 or more in both approximately 100 vertical and approximately 100 horizontal focusing points. The focusing system can include dynamic functions to lock in the optical focusing point based on logic and calculations made by the software including "Smart Object Detection" focusing.

The lenses can reside in front of optical sensor 122 for capturing optical data 121 and can be of a complementary metal-oxide-semiconductor active pixel sensor (CMOS) or digital charge-coupled device (CCD) design. Optical sensor 122 converts an optical image into an electronic signal for processing into digital media via the lens setup in front of the optical sensor. Exemplary ranges for megapixel size are from approximately 18 megapixels to approximately 100 megapixels. In implementations where user device 110 is utilized, data from optical sensor 122 can be higher in megapixels than that of a camera (not shown) of user device 110. Also, as the data can be unfiltered and non-aliasing it can be of higher quality than data from the camera of user device 110. Furthermore, the lens of lenses can be larger (e.g. provide a larger depth of field) than that of the camera of the user device 110.

Additional Implementations for the present disclosure may include, but are not limited to:

Money Counting—Capture optical data 121 of bills, coins, wads of cash, etc. and detection software application 134 can identify and count the denominations using object detection module 136.

Cash Tracking—Capture optical data 121 cash at every stage of handling to ensure no discrepancies using detection software application 134.

Precious metals—Capture optical data 121 for precious metals (gold, silver, platinum) and count and give a weight estimate for the precious metals using object detection module 136 of detection software application 134.

Banks—Capture reference data 124 of a bank vault every day as it is closed, and capture subsequent data 125 the next morning as it is opened to identify even minute discrepancies in money, etc. using detection software application 134. Similar concept for safety deposit boxes.

Armored Vehicles—Capture reference data 124 of money before it is loaded in a truck, capture subsequent data 125 of it in the truck, than another subsequent data 125 as it is offloaded in a bank and detection software application 134 can track money and note any discrepancies in discrepancy log 137.

Restaurants & Bars—Capture optical data 121 of liquor, food, and/or other inventory at closing every day and compare remaining amount of alcohol with sales to track pour costs, inventory stocks, pour costs, alcohol usage using detection software application 134. Furthermore, detection software application 134 can keep track of patron length of stay by capturing optical data 121.

Customer tracking—Once a visitor walks into and an establishment (e.g. a retail establishment, a restaurant, a bar), reference data 124 can be captured of the visitor and subsequent data 125 can be periodically captured and compared to reference data 124 to determine a length of stay, items ordered, etc. so as to generate statistical data using detection software application 134.

Any industry that deals with a lot of keys—Capture optical data 121 of the container keys are stored in, detection software application 134 can count the keys and identify which are missing (e.g. 2 keys missing, the Toyota and Honda, 2 agents out on test drives, etc) using comparing module 135 and object detection module 136.

Parts supplier—Capture reference data 124 of inventory every morning and capture subsequent data 125 of the inventory every night. Detection software application 134 can log anything missing from the inventory using discrepancy log 137.

Repair shops—Detection software application 134 can inventory parts for vehicles from optical data 121 captured by the user.

Vehicle engines/superchargers—Capture optical data 121 of a vehicle engine/supercharger and determine if parts are missing or out of place using object detection module 136 of detection software application 134. This may be done during assembly.

Tires—Determine wear on the tracking of the tires using detection software application 134 by capturing optical data 121 of the tires. Show difference between good/bad, new/worn tires.

Inventory tracking at large warehouses or stores—Capture reference data 124 every morning and capture subsequent data 125 every night. Detection software application 134 can count inventory and log and discrepancies in discrepancy log 137 for electronics stores, retail stores, shoe stores, Nutrition/Supplement stores, game stores, grocery stores, etc. Discrepancies may be compared to sales receipts and noted in discrepancy log 137. This can include counting and tracking pallets in a warehouse.

Board games—Classic games (Chess, backgammon, etc.) and tabletop games (Dungeons and Dragons, Magic, Miniatures, etc.)

Inventory delivery—Capture reference data 124 of delivery dock before and capture subsequent data 125 of delivery dock after deliveries. Ensure only differences are products your store is receiving using detection software application 134.

Office Security—Capture reference data 124 of an office as you lock up. Capture subsequent data 125 in the morning. Detection software application 134 can detect any changes/disturbances in the office by reference data 124 and subsequent data 125 using comparing module 135 of detection software application 134.

Airports—Capture reference data 124 of baggage before it is loaded onto a plane and capture subsequent data 125 of the baggage after it has been offloaded, detection software application 134 will determine any missing items between those times. A security camera can scan a wide area can periodically capture high resolution optical data 121. Detection software application 134 can identify any object that has not moved for an extended period of time.

Law enforcement—Capture optical data 121 of an evidence locker every time it is locked up and every time it is opened, detection software application 134 can detect any changes from the last time optical data 121 was captured, ensuring a proper chain of evidence and custody.

Restricted items (firearms, riot gear)—Capture optical data 121 of items in an armory. Detection software application 134 can identify and count the controlled items using object detection module 136.

VIP security—(determine if windows have been opened, vehicles have changed position) by processing captured optical data 121 using detection software application 134.

Military/Police/Fire—Capture optical data 121 of gear in a gear inspection, detection software application 134 can identify the items in optical data 121, and can point out placement discrepancies and ensure all items being inspected are present. Capture optical data 121 of a license plate. Detection software application 134 can identify the license plate number and list previous owners, current owners, violations, warrants, or if vehicle has been reported stolen by owner based on DMV or other records.

Anti shadowing—Determine if vehicles are following you. Cameras on a vehicle can periodically capture optical data 121 of an area surrounding an equipped vehicle. Detection software application 134 can analyze optical data 121, identify vehicles, and point out any vehicles that have appeared in several photos.

Gated Communities—Track resident and visitor vehicles by capturing optical data 121 of the gated communities and processing optical data 121 using detection software application 134.

Security—Capture reference data 124 of the inside of your house before you lock up and capture subsequent data 125 of the inside of your house as you enter. Detection software application 134 can detect any differences in optical data 121 and identify them using comparing module 135.

Concerts/Large Events—Large scale counting, estimation, and security and be employed by capturing optical data 121 of a large area. Detection software application 134 can count or estimate the number of objects in the field of view based on at least reference data grid 143. Examples of those objects include people, vendors, and/or vehicles.

Yield Estimator (plants)—Capture optical data 121 of a crop in mid stage. Detection software application 134 identifies the number, type, and/or size of the crop and estimates a crop yield and present value.

Inventory tracker for dispensaries—Capture reference data 124 of the jars containing the buds every morning and capture subsequent data 125 of the jars every evening. Reconcile with sales receipts. Note discrepancies in discrepancy log 137 using detection software application 134. Prevent employee theft and other shrinkage.

Pharmacy use—Count pills to ensure proper dosage prescription by utilizing detection software application 134 on captured optical data 121 of the pills. Track inventory.

Jewelry Stores—Capture optical data 121 of display case. Detection software application 134 can count and identify the items in optical data 121.

Digital Jeweler's magnifier (loupe)—Detection software application 134 can estimate a rating on a diamond by comparing optical data 121 to at least one reference data grid 143.

Determine if an object is genuine—Use detection software application 134 to compare subsequent data grid 144 with at least one reference data grid 143 to determine if an object is fake or real. Examples include precious stones, tickets, cloths, money, and jewelry.

Drug tracking—Capture optical data 121 of a container of a controlled substance. Detection software application 134 can count the number of pills in the container, number of pills dispersed, and note any discrepancies in discrepancy log 137.

Health information—Capture optical data 121 of an injury, detection software application 134 can make a comparison to at least one reference data grid 143 to get information on that injury/treatment. Similarly, detection software application 134 can be used to detect and/or provide information about potential diseases.

Dental/Medical Offices—Track equipment, drugs, and inventory. Capture reference data 124 of medical equipment prior to surgery and capture subsequent data 125 of the medical equipment again after the surgery to determine if any equipment is missing and possibly still inside the patient using detection software application 134.

Moving Companies—Capture reference data 124 of items to be moved before loading onto a truck, capture subsequent data 125 of the items in the truck, and capture subsequent data 125 of the items after offloading. Detection software application 134 can identify and count boxes to ensure nothing has been broken or misplaced.

Guns/accessories—Capture reference data 124 of a gun case at the beginning of the day/shift and capture subsequent data 125 of the gun case at end of every day/shift (e.g. at a shooting range). Detection software application 134 can identify and count guns/accessories, ensuing they are all present and in their correct place.

Ammo—Track inventory levels of ammunition. Capture reference data 124 of a crate at the beginning of the day and capture subsequent data 125 of the crate at end of the day. Detection software application 134 can estimate how many rounds have been used and may compare with sales receipts.

Hobbyists (model trains, miniature games)—Capture optical data 121 of various parts and pieces of a model. Detection software application 134 will identify and count the items to unsure nothing gets lost or is missing. Reference data grid 143 will include the parts that should be present.

Port/Harbor—Detection software application 134 can track ships, vehicles, and equipment in a port or harbor by capturing optical data 121 of the port/harbor.

Surveying—Use detection software application 134 to capture optical data 121 of an area. GPS 114 of user device 110 can be used in conjunction with mapping software, such as Google maps, to identify the area and/or provide survey data.

Parking Enforcement—A parking attendant or security camera can capture optical 121 data of a parking lot at regular intervals. Detection software application 134 can identify vehicles that have been parked longer than a designated period of time. A parking meter can include capturing device 120 that captures optical data 121 of a vehicle when it parks or when payment is made. The meter may cancel any remaining time once the vehicle leaves a parking spot. Detection software application 134 can also be used to determine whether an unauthorized vehicle is parked in an unauthorized position, such as in a reserved parking space, a fire lane, a handicap spot, or a spot requiring a permit. For example, reference data grid 143 could include information that describes/depicts authorized vehicles. This may include a handicap placard for a handicap spot or a parking permit for a spot requiring a permit.

Zoos/Pet Stores—Detection software application 134 can track/count animals, food, and equipment by capturing optical data 121 of the zoos or pet stores.

Physical fitness—Capture optical data 121 of a body or body part. Detection software application 134 can assess a fitness level. Furthermore, by capturing optical data 121 on a regular basis, detection software application 134 can determine growth/loss and/or other metrics of progress. Detection software application 134 may further determine asymmetry a body, such as where one bicep is larger than the other, etc. In a gym, detection software application 134 can be used to track/count barbells, towels, and other equipment.

Bookstores—Capture optical data 121 of a bookshelf, detection software application 134 can identify books and may compare subsequent data 125 of the bookshelf to earlier captured reference data 124 of the bookshelf to determine discrepancies. Those discrepancies can be compared to sales receipts.

Schools—Detection software application 134 can be utilized to determine attendance at a school. Subsequent data 125 may be captured in a classroom with assigned seats and compare that to reference data 124 of the classroom to determine missing students and empty seats.

Room Planner—Capture optical data 121 of a room and furniture, allow a user to plan out the room virtually. Detection software application 134 will identify the objects and create or associate that object to corresponding digital representations.

Identify clothes—Capture optical data 121 of a person and detection software application 134 can identify the clothes they are wearing may compare subsequent data 125 to at least one reference data grid 143 of clothes.

Contract scanner—Capture optical data 121 of each page of a contract at various points in time. Detection software application 134 can determine and log any discrepancies/changes in the contract in discrepancy log 137.

Car/airplane/ship information—Capture optical data 121 of a car/airplane/ship, detection software application 134 can provide information, statistics, local dealerships, cost, etc. Detection software application 134 may also log differences in discrepancy log 137 between the vehicle in subsequent data 125 and the same make and model in reference data grid 143. For example, any dents, broken or missing windshield wipers or headlights, worn tires, and head light oxidation could be logged.

Object finding—Capture optical data 121 and provide a search term, detection software application 134 can identify and/or locate the object corresponding to the search term in optical data 121.

Real Estate/Business—Capture optical data 121 of a house or business. Detection software application 134 can list all previous owners, purchase price, any existing liens, reviews of a business, etc. Google maps and GPS 114 of user device 110 may facilitate these features.

Advertising/layout—Capture subsequent data 125 of a picture of a display or advertisement. Detection software application 134 can log discrepancies in discrepancy log 137 from approved advertising layout in reference data grid 143 so as to ensure layout compliance.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A device comprising:
    a memory storing a detection software application;
    a capturing device; and
    a processor configured to execute the detection software application to:
        capture a reference optical data using the capturing device;
        capture a subsequent optical data using the capturing device;
        determine differences between the reference optical data and the subsequent optical data based on comparing a count of how many of an object are present in the subsequent optical data to a count of how many of the object are present in the reference optical data; and
        display information corresponding to the differences between the reference optical data and the subsequent optical data.

2. The device of claim 1, wherein to determine the differences between the reference optical data and the subsequent optical data, the processor is configured to execute the detection software application to:
    transmit the reference optical data to a server;
    transmit the subsequent optical data to the server; and
    receive a notification from the server that includes the information corresponding to the differences between the reference optical data and the subsequent optical data, wherein the differences include a comparison of the subsequent optical data to the reference optical data.

3. The device of claim 1, wherein to determine the differences between the reference optical data and the subsequent optical data, the processor is configured execute the detection software application to:
    generate a first data grid based on the reference optical data;
    generate a second data grid based on the subsequent optical data; and
    compare the second reference grid to the first reference grid to determine the differences between the reference optical data and the subsequent optical data.

4. The device of claim 1, wherein the reference optical data and the subsequent optical data each include at least one of a still image, a video, a data stream, a series of still images, and a panorama.

5. The device of claim 1, wherein the capturing of the subsequent optical data is in response to an expiration of a predetermined time interval after the capturing of the reference optical data.

6. The device of claim 1, wherein the processor is further configured to execute the detection software application to:
    generate an alert in response to the determining of the differences between the reference optical data and the subsequent optical data.

7. The device of claim 1, wherein before the capture of the subsequent optical data, the processor is further configured execute the detection software application to:
    store camera configuration data corresponding to the capturing of the reference optical data in the memory;
    retrieve the camera configuration data from the memory; and
    configure the capturing device using the camera configuration data.

8. A method for use by a device to compare subsequent optical data to reference optical data, the method comprising:
    capturing the reference optical data using a capturing device;
    capturing the subsequent optical data using the capturing device;
    determining differences between the reference optical data and the subsequent optical data based on comparing a count of how many of an object are present in the subsequent optical data to a count of how many of the object are present in the reference optical data; and displaying information corresponding to the differences between the reference optical data and the subsequent optical data on a display of the device.

9. The method of claim 8, wherein to determine the differences between the reference optical data and the subsequent optical data, the method comprises:

transmitting the reference optical data to a server;

transmitting the subsequent optical data to the server; and receiving a notification from the server that includes the information corresponding to the differences between the reference optical data and the subsequent optical data, wherein the differences include a comparison of the subsequent optical data to the reference optical data.

10. The method of claim 8, wherein to determine the differences between the reference optical data and the subsequent optical data, the method comprises:

generating a first data grid based on the reference optical data;

generating a second data grid based on the subsequent optical data; and comparing the second reference grid to the first reference grid to determine the differences between the reference optical data and the subsequent optical data.

11. The method of claim 8, wherein the reference optical data and the subsequent optical data each include at least one of a still image, a video, a data stream, a series of still images, and a panorama.

12. The method of claim 8, wherein the capturing of the subsequent optical data is in response to an expiration of a predetermined time interval after the capturing of the reference optical data.

13. The method of claim 8, wherein the method further comprises:

generating an alert in response to the determining of the differences between the reference optical data and the subsequent optical data.

14. The method of claim 8, wherein before the capturing of the subsequent optical data, the method further comprises:

storing camera configuration data corresponding to the capturing of the reference optical data in a memory;

retrieving the camera configuration data from the memory; and configuring the capturing device using the camera configuration data.

15. The device of claim 1, wherein the processor is configured to execute the detection software application to determine the differences between the reference optical data and the subsequent optical data further based on comparing a first location of an object in the subsequent optical data to a second location of the object in the reference optical data.

16. The device of claim 15, wherein the displayed information provides inventory or customer tracking information.

17. The device of claim 1, wherein the displayed information provides inventory or customer tracking information.

18. The device of claim 1, further comprising a display, and wherein the hardware processor is further configured to execute the detection software application to:

render, on the display, the information corresponding to the differences between the reference optical data and the subsequent optical data in the form of a chart mapping the differences between the reference optical data and subsequent optical data.

19. The device of claim 1, wherein the image capture device is configured to optimize wide angle and telephoto image capture.

20. A device comprising:

a memory storing a detection software application;

a capturing device configured to optimize wide angle and telephoto image capture; and a processor configured to execute the detection software application to:

receive a user selected format for capturing optical data using the capturing device;

capture, using the capturing device and the user selected format, a reference optical data;

capture, using the capturing device and the user selected format, a subsequent optical data;

determine differences between the reference optical data and the subsequent optical data; and display information corresponding to the differences between the reference optical data and the subsequent optical data.

* * * * *